United States Patent [19]
Wang

[11] Patent Number: 5,924,201
[45] Date of Patent: Jul. 20, 1999

[54] CONTROL MECHANISM FOR PIPE CUTTER

[76] Inventor: Hsing-Liang Wang, No.14, Lane 405,Sec.2,Hsing-An Road, Taichung, Taiwan

[21] Appl. No.: 09/002,797

[22] Filed: Jan. 5, 1998

[51] Int. Cl.[6] .................................................. B23D 21/06
[52] U.S. Cl. ................................................ 30/92; 30/243
[58] Field of Search ........................ 30/92, 94, 182–185, 30/218, 241–243, 335

[56] References Cited

U.S. PATENT DOCUMENTS 1,412,293  4/1922  Sewell .................................. 30/185 X

*Primary Examiner*—Douglas D. Watts
*Attorney, Agent, or Firm*—Charles E. Baxley

[57] ABSTRACT

A pipe cutter includes a housing having a number of teeth formed in the two inner sides. A slide is slidably engaged in the housing and a cutter blade is secured to the slide and to be moved to cut a pipe. A hand grip may be moved toward a handle of the housing for moving the cutter blade forward step by step. A pair of catches are pivotally secured to the slide by pivot pins, and a spring may bias the catches to engage with the teeth of the housing in order to prevent the slide from moving rearward. The housing has two guiding surfaces for disengaging the catches from the teeth and for allowing the slide to be moved backward automatically.

5 Claims, 7 Drawing Sheets

CONTROL MECHANISM FOR PIPE CUTTER

BACKGROUND OF THE INVENTION

1. Field of the Invention

The present invention relates to a pipe cutter, and more particularly to a pipe cutter having an improved control mechanism.

2. Description of the Prior Art

Typical pipe cutters comprise a cutter blade slidably engaged in the gun body and a driving mechanism engaged with the cutter blade for moving the cutter blade forward step by step and for cutting a pipe member. When the pipe is cut, the cutter blade may not be recovered automatically.

The present invention has arisen to mitigate and/or obviate the afore-described disadvantages of the conventional pipe cutters.

SUMMARY OF THE INVENTION

The primary objective of the present invention is to provide a pipe cutter having a control mechanism which say cause the cutter blade to be automatically recovered after the pipe is cut.

In accordance with one aspect of the invention, there is provided a pipe cutter comprising a housing including a front portion having an opening for engaging with a pipe to be cut and including a rear portion having a handle, a slide slidably engaged in the housing, the slide including a lower portion having a plurality of teeth, a cutter blade secured to the slide and adapted to be moved toward the opening of the housing for cutting the pipe, a hand grip pivotally coupled to the housing at a pivot shaft, the hand grip including an upper end, a pawl pivotally secured to the upper end of the hand grip, and means for biasing the pawl to engage with the teeth of the slide. The slide and the pipe cutter are moved forward when the hand grip is pulled toward the handle and rotated about the pivot shaft, and the pawl may be moved rearward relative to the slide against the biasing means when the hand grip is rotated away from the handle.

In accordance with another aspect of the invention, there is provided a pipe cutter comprising a housing including a front portion having an opening for engaging with a pipe to be cut and including a rear portion having a handle, the housing including a notch formed in the front portion of the housing and communicating with the opening, a slide slidably engaged in the housing, the slide including a longitudinal axis and including a front portion having an engaging slot perpendicular to the longitudinal axis of the slide, a seat including an engaging member for engaging with the engaging slot of the slide and for allowing the seat to be secured to the slide, a cutter blade secured to the seat and adapted to be moved toward the opening of the housing for cutting the pipe by the slide and the seat, and means for moving the cutter blade into the opening of the housing for cutting the pipe. The seat may be disengaged from the slide when the engaging member is disengaged from the engaging slot and when the seat and the cutter blade are moved into the opening.

The slide includes a shoulder, the seat includes a stop for engaging with the shoulder of the slide and for limiting a relative downward movement of the seat to the slide and for preventing the seat from being disengaged from the slide.

In accordance with a further aspect of the invention, there is provided a pipe cutter comprising a housing including a front portion having an opening for engaging with a pipe to be cut and including a rear portion having a handle, the housing including two sides each having a plurality of teeth, a slide slidably engaged in the housing, a cutter blade secured to the slide and adapted to be moved toward the opening of the housing for cutting the pipe, means for moving the cutter blade into the opening of the housing for cutting the pipe, a pair of catches each pivotally secured to the slide at a pivot pin, and means for biasing the catches to engage with the teeth of the housing in order to prevent the slide from moving rearward.

The housing includes a pair of guiding surfaces for engaging with the catches and for rotating the catches about the pivot pins when the cutter blade is moved into the opening of the housing, the catches each includes a pole, the biasing means includes a spring engaged between the poles of the catches, the spring is provided for biasing the catches to engage with the teeth of the housing, and the poles and the spring are caused to be moved pass the pivot pin for rotating the catches toward each other when the catches are engaged with the guiding surfaces. The housing includes two grooves formed in the sides of the housing respectively, the catches each includes a knob extended outward of the housing via the grooves for actuating the catches.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 2:
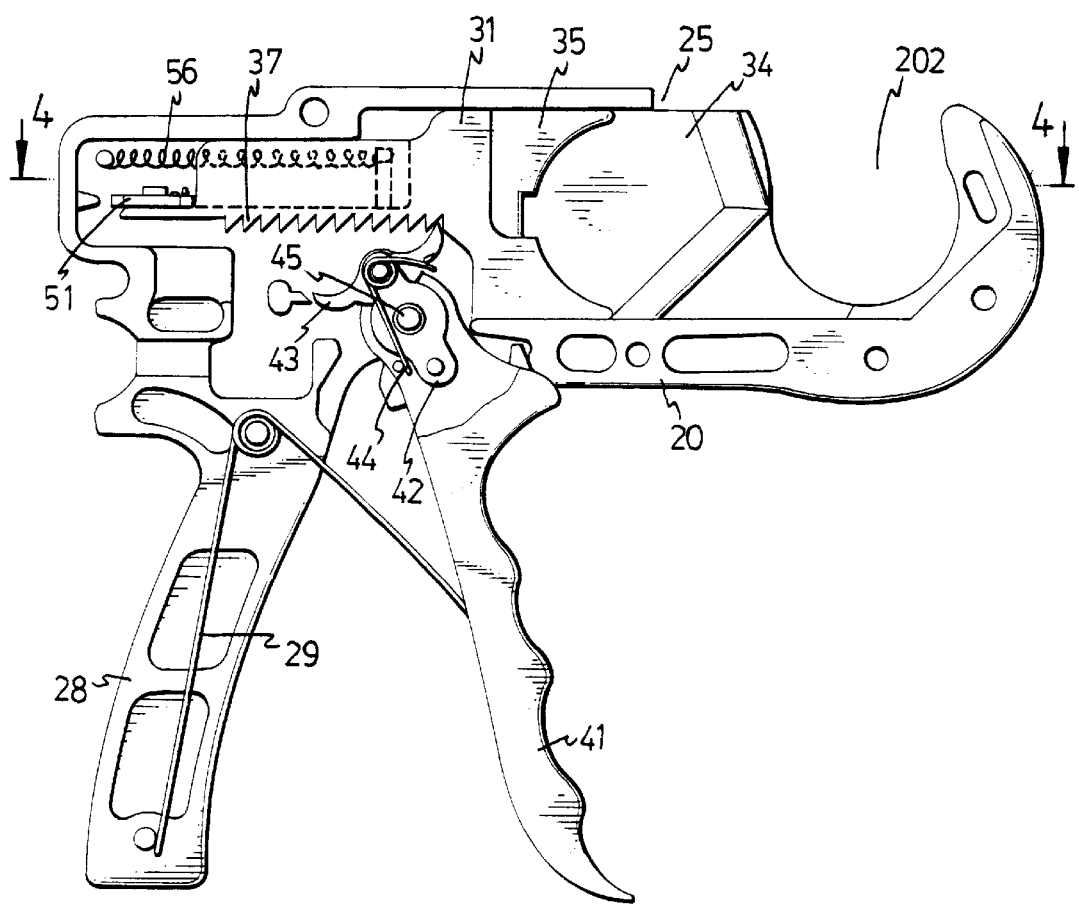
FIG. 2 is a plan view of the pipe cutter, in which one half of the housing is removed for showing the interior of the pipe cutter.
Figure 3:
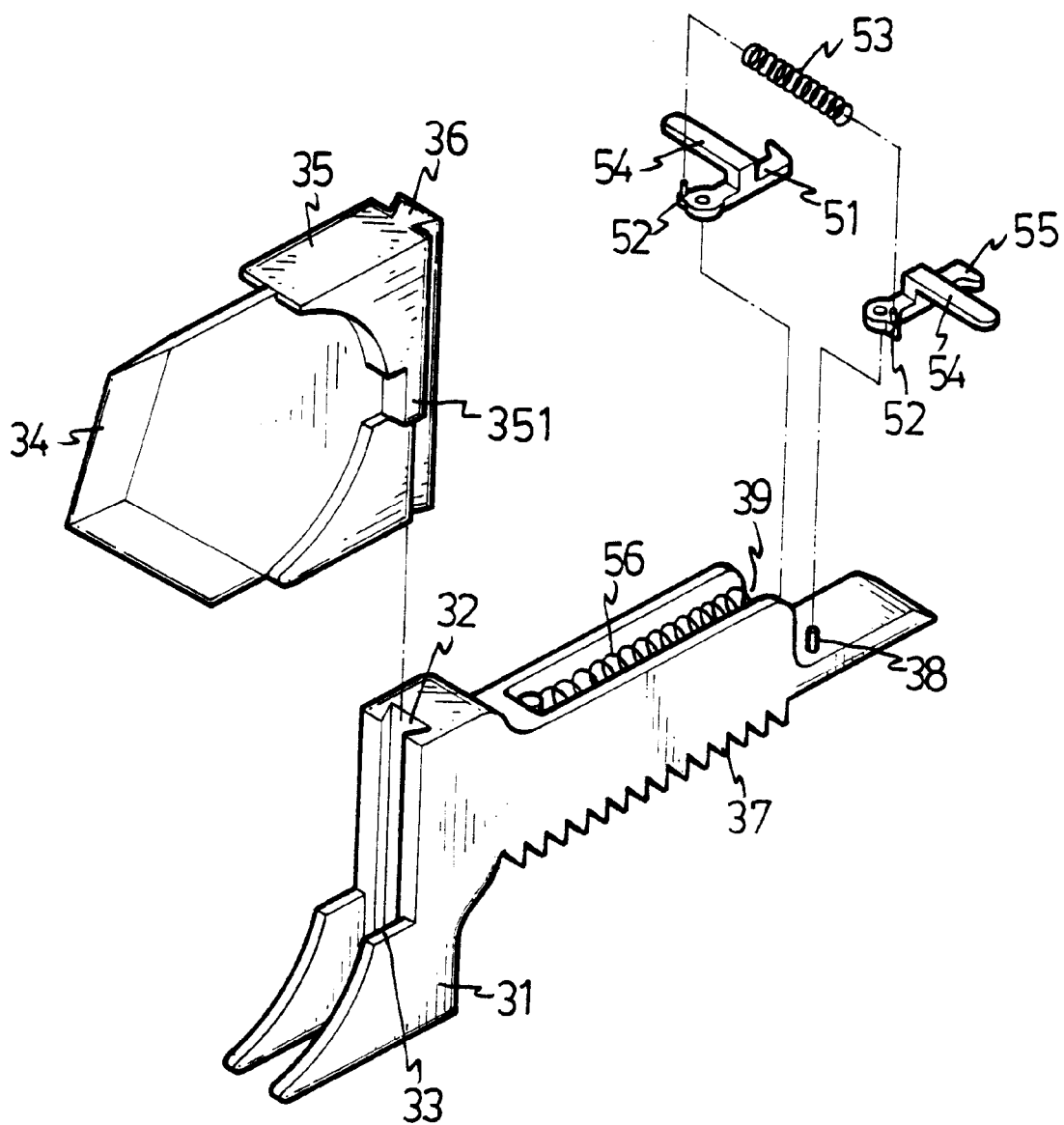
FIG. 3 is a partial exploded view of the control mechanism.
Figure 4:
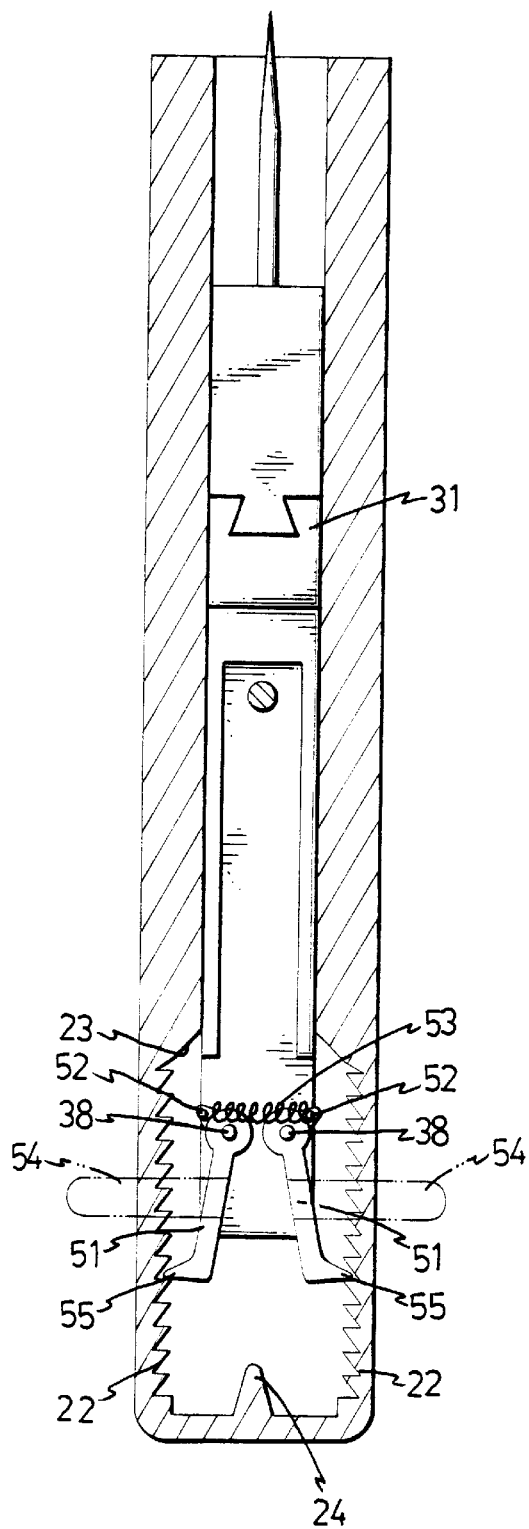
FIG. 4 is a cross sectional view taken along lines 4—4 of FIG. 2.

Referring to the drawings, and initially to FIGS. 1–4, a pipe cutter in accordance with the present invention comprises a housing 20 which is preferably formed by two half members. The housing 20 includes a handle 28 provided on the rear portion and includes an opening 202 formed in the front portion for receiving a pipe to be cut. A hand grip 41 has an upper end pivotally coupled to the housing 20 at a pivot shaft 45. A spring 29 is engaged between the handle 28 and the hand grip 41 for biasing the hand grip 41 away from the handle 28. The housing 20 includes a pair of grooves 21 formed in the sides of the rear portion (FIG. 1), and includes two inner sides each having a number of ratchet teeth 22 and each having a guiding (tapered) surface 23 formed in front of the teeth 22 (FIG. 4). A projection 24 is provided in the rear end of the housing 20.

A slide 31 is slidably engaged in the housing 20 and movable forward and rearward. The slide 31 includes a lower portion having a number of ratchet teeth 37 and includes a front portion having a engaging slot, such as a dovetail slot 32 (FIG. 3) perpendicular to the longitudinal axis of the slide 31. The slide 31 includes a shoulder 33 formed in the middle of the front portion. A cutter blade 34 is secured to a seat 35 which has an engaging member, such as a dovetail 36, for engaging with the dovetail slot 32 of the slide 31 and for securing the cutter blade 34 to the slide 31. The seat 35 includes a stop 351 for engaging with the shoulder 33 of the slide 31 and for stably securing the cutter blade 34 to the slide 31. The slide 31 includes a chamber 39 for receiving a spring 56 which couples the slide 31 to the rear end of the housing 20 and for moving the slide 31 rearward of the housing 20 and for moving the cutter blade 34 away from the opening 202.

A pawl 43 is secured to the upper end 42 of the hand grip 41, and a spring 44 is engaged with the pawl 43 for biasing the pawl 43 to engage with the ratchet teeth 37 of the slide 31. The slide 31 and thus the cutter blade 34 nay be moved forward by the pawl 43 when the pawl 43 is rotated about the pivot shaft 45 by the hand grip 41. The pawl 43 may be caused to move rearward relative to the teeth 37 against the spring 44 when the hand grip 41 is released.

As shown in FIGS. 3 and 4, the slide 31 includes two pins 38 provided on the rear portion. A pair of catches 51 are pivotally coupled to the slide 31 at the pins 38 and each includes a knob 54 extended outward of the housing 20 via the grooves 21, and each includes a tip 55 for engaging with the ratchet teeth 22 of the housing 20, and each includes a pole 52 located close to the pin 38. A spring 53 are engaged with the poles 52 for biasing the tips 55 of the catches 51 to engage with the ratchet teeth 22 of the housing 20 and for preventing the slide 31 from being moved rearward by the spring 58 (FIG. 2).

Figure 5:
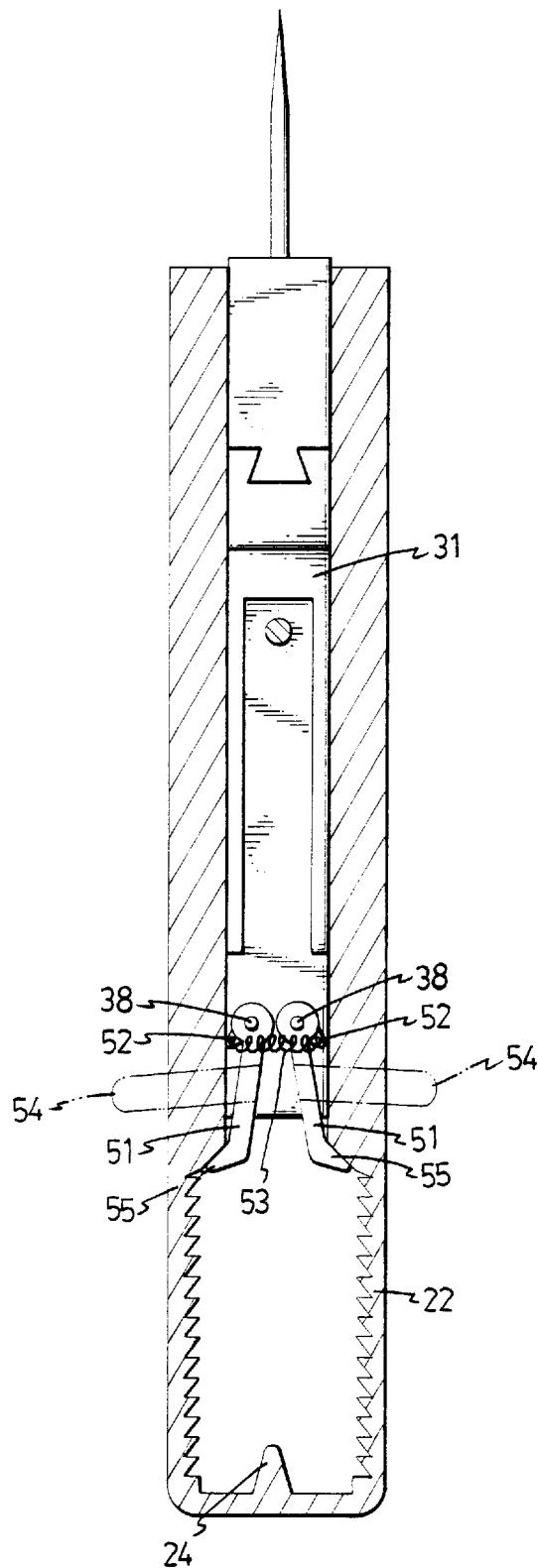
FIGS. 5, 6, 7 are cross sectional views similar to FIG. 4, illustrating the operation of the pipe cutter.
Figure 6:
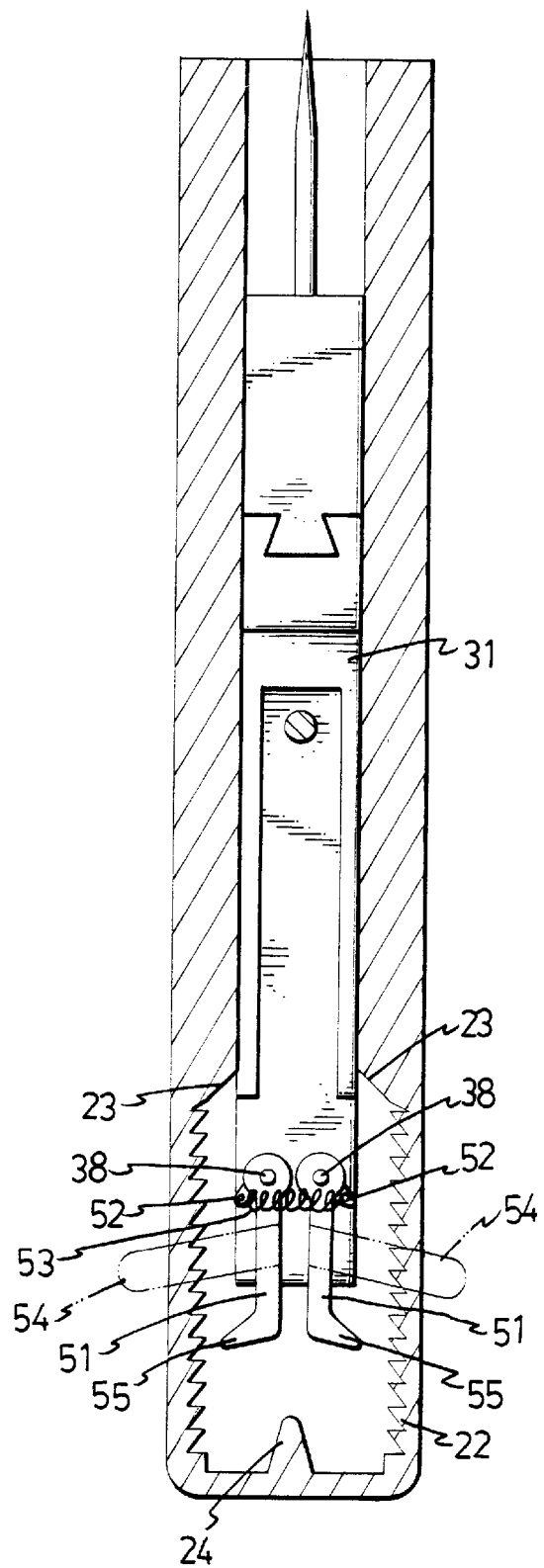
Figure 7:
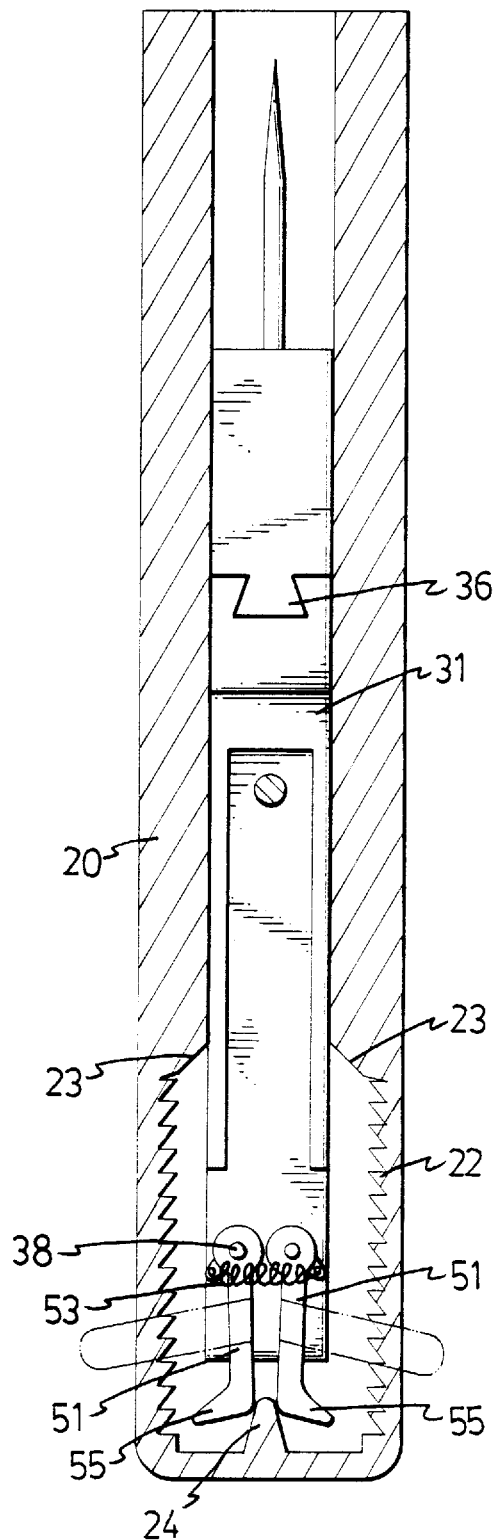

In operation, the cutter blade 34 nay be moved forward by the hand grip 41 via the pawl 43 when the hand grip 41 is pulled toward the handle 28 and rotated about the pivot shaft 45. The catches 51 say prevent the slide 31 from moving rearward. As shown in FIG. 5, when the cutter blade 34 has been fully moved forward, the tips 55 of the catches 51 may engage with the tapered surfaces 23 of the housing 20 such that the catches 51 may be caused to be rotated about the pins 38. After the catches 51 are rotated, the poles 52 may also be rotated about the pins 38 such that the spring 53 may be caused to move pass the pins 38 and such that the spring 53 may disengage the catches 51 from the teeth 22 (FIG. 6), and such that the slide 31 may be pulled rearward by the spring 56 automatically. As shown in FIG. 7, when the slide 31 is pulled to the rearmost position of the housing 20, the projection 24 may cause the catches 51 to rotate about the pins 38 against the spring 53 and may move the spring 53 pass the pins 38 such that the catches 51 may be biased to engage with the teeth 22 again by the spring 53.

Figure 1:
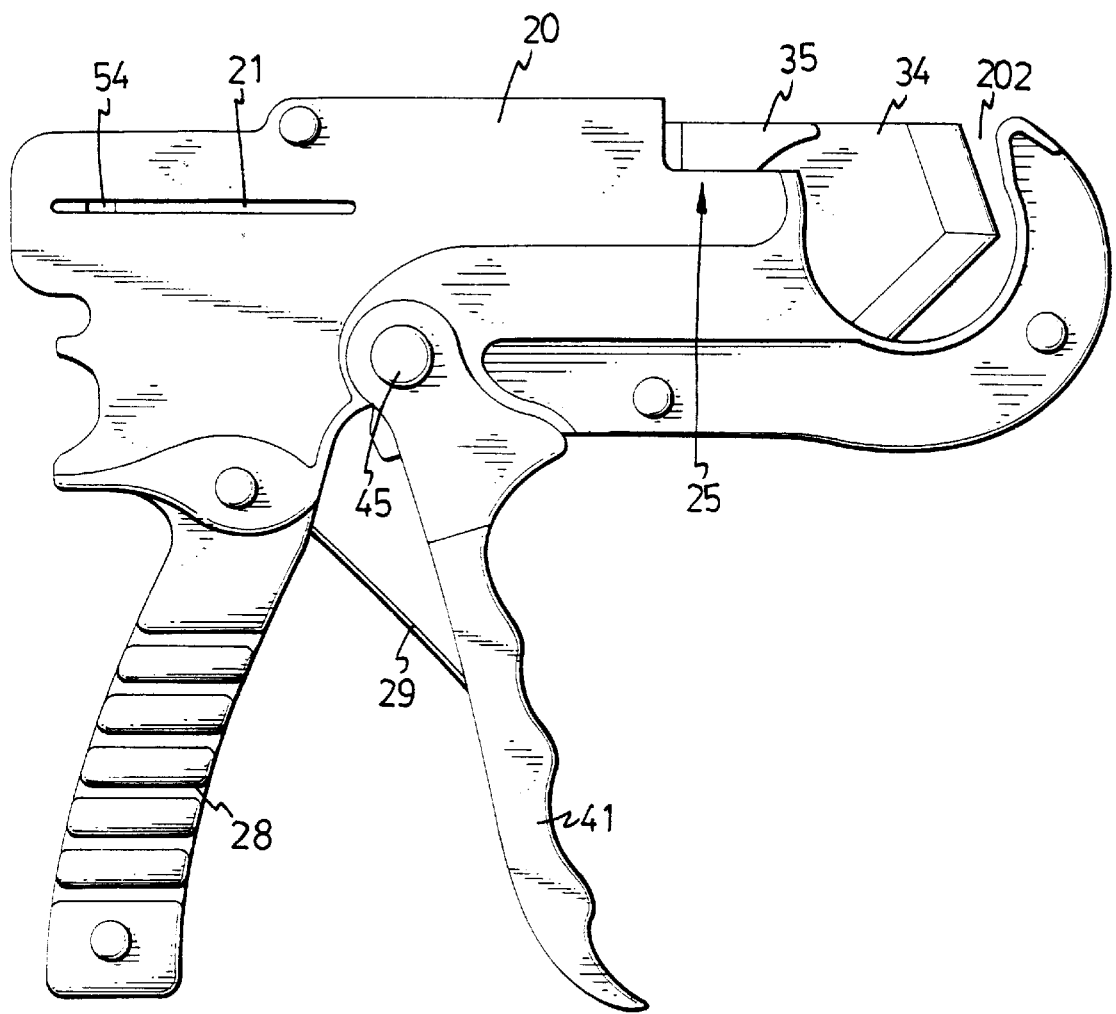
FIG. 1 is a plan view of a pipe cutter in accordance with the present invention.

As shown in FIG. 1, the housing 20 includes a notch 25 formed in the front portion and communicating with the opening 202. When the cutter blade 34 is fully moved forward, the seat 35 may be directly pulled upward and disengaged from the slide 31 via the notch 25, such that the cutter blade 34 may be easily replaced with a new one. The catches 51 may also be disengaged from the teeth 22 manually with the knobs 54.

Accordingly, the pipe cutter in accordance with the present invention includes a control mechanism which may cause the cutter blade to be automatically recovered after the pipe is cut.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A pipe cutter comprising:

a housing including a front portion having an opening for engaging with a pipe to be cut and including a rear portion having a handle, said housing including a notch formed in said front portion of said housing and communicating with said opening, a slide slidably engaged in said housing, said slide including a longitudinal axis and including a front portion having an engaging slot perpendicular to the longitudinal axis of said slide, a seat including an engaging member for engaging with said engaging slot of said slide and for allowing said seat to be secured to said slide, a cutter blade secured to said seat and adapted to be moved toward said opening of said housing for cutting the pipe by said slide and said seat, and means for moving said cutter blade into said opening of said housing for cutting the pipe, said seat being allowed to be disengaged from said slide when said engaging member is disengaged from said engaging slot and when said seat and said cutter blade are moved into said opening.

2. The pipe cutter according to claim 1, wherein said slide includes a shoulder, said seat includes a stop for engaging with said shoulder of said slide and for limiting a relative downward movement of said seat to said slide and for preventing said seat from being disengaged from said slide.

3. A pipe cutter comprising:

a housing including a front portion having an opening for engaging with a pipe to be cut and including a rear portion having a handle, said housing including two sides each having a plurality of teeth, a slide slidably engaged in said housing, a cutter blade secured to said slide and adapted to be moved toward said opening of said housing for cutting the pipe, means for moving said cutter blade into said opening of said housing for cutting the pipe, a pair of catches each pivotally secured to said slide at a pivot pin, and means for biasing said catches to engage with said teeth of said housing in order to prevent said slide from moving rearward.

4. The pipe cutter according to claim 3, wherein said housing includes a pair of guiding surfaces for engaging with said catches and for rotating said catches about said pivot pins when said cutter blade is moved into said opening of said housing, said catches each includes a pole, said biasing means includes a spring engaged between said poles of said catches, said spring is provided for biasing said catches to engage with said teeth of said housing, and said poles and said spring are caused to be moved pass said pivot pin for rotating said catches toward each other when said catches are engaged with said guiding surfaces.

5. The pipe cutter according to claim 4, wherein said housing includes two grooves formed in said sides of said housing respectively, said catches each includes a knob extended outward of said housing via said grooves for actuating said catches.

* * * * *